E. L. BURKET.
DISTANCE FINDER.
APPLICATION FILED JAN. 27, 1916.
1,203,097.
Patented Oct. 31, 1916.
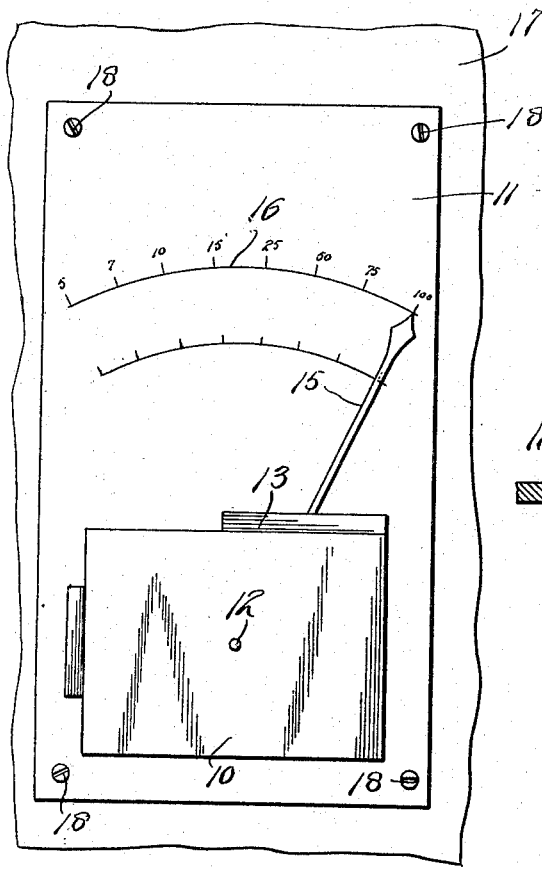
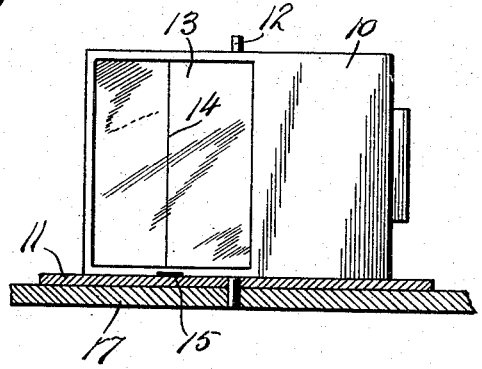
WITNESSES
INVENTOR
Elmer L. Burket.
BY
ATTORNEY

UNITED STATES PATENT OFFICE.

ELMER L. BURKET, OF ROARING SPRING, PENNSYLVANIA.

DISTANCE-FINDER.

1,203,097.　　　　　Specification of Letters Patent.　　Patented Oct. 31, 1916.

Application filed January 27, 1916. Serial No. 74,677.

*To all whom it may concern:*

Be it known that I, ELMER L. BURKET, a citizen of the United States, residing at Roaring Spring, in the county of Blair and State of Pennsylvania, have invented certain new and useful Improvements in Distance-Finders, of which the following is a specification.

This invention relates to an improved finder for use upon a camera and the principal object of the invention is to provide the finder with an attachment so constructed that the distance from the camera to the object can be readily ascertained thus permitting the bellows to be properly set and thus insuring the proper focus to be obtained.

Another object of the invention is to so construct the device that it may be readily operated, the attachment being very simple in construction and requiring no experience for its proper use.

This invention is illustrated in the accompanying drawings, wherein:—

Figure 1 shows the attachment in elevation and mounted upon a camera, a fragment of which is shown. Fig. 2 is a view showing the finder in top plan, a fragment of the camera being shown in section.

The finder 10 which is of the usual construction is pivotally connected with the bed or base plate 11 by means of the pin 12 and is provided with the usual ground glass 13 which will be provided with a thread 14, the object of which will be hereinafter brought out. A pointer 15 is carried by the finder and extends with its free end coöperating with the scale 16 marked upon the base plate 11 which is secured to the camera box 17 by means of the screws or other fasteners 18. It should be noted that the thread 14 is positioned in alinement with the pointer 15 as shown in Fig. 2 so that there will be a coöperation between the pointer 15 and the thread 14.

The operation of this finder is as follows:—When in use the finder is used in the ordinary manner and after the object is located the finder is turned in a direction which would be toward the left in Fig. 1 thus moving the finger 15 from the mark 100 in the scale 16 toward the mark 5, these marks indicating feet or any other unit of measure. The finder is turned in this direction until the foot of the object is lined by the thread 14 and the scale then read. Thus if the pointer 15 stops at the mark 10, it is shown that the camera is ten feet away from the object being photographed. The distance from the camera to the object being photographed has now been ascertained and the bellows (not illustrated) will be set at the proper point and the picture taken. The bellows which forms part of the ordinary camera mechanism has not been illustrated as this does not form part of the invention.

It will thus be seen that a finder has been provided with which the distance between the camera and the object being photographed can be easily and readily ascertained thus preventing the necessity of guessing at the distance and in many instances spoiling a picture by having it out of focus.

What is claimed is:—

1. A camera attachment comprising a base plate having a scale marked thereon, a finder pivotally connected with said base plate and including a glass, a pointer extending from said finder and coöperating with the scale on said base plate, and a thread extending across said glass in alinement with said pointer.

2. A camera attachment comprising a base plate having a scale marked thereon, a finder movably connected with said base plate and including a glass having an indicating mark thereon, and a pointer extending from said finder and having its free end terminating in operative relation to the scale marked upon said base plate.

3. A camera attachment including a finder, a base plate for pivotally mounting said finder and provided with a scale, and a pointer extending from said finder in operative relation to said scale.

4. A camera attachment including a finder, means for pivotally mounting said finder, a scale, and a pointer extending from said finder in operative relation to said scale.

5. A camera attachment including a finder, an indicating element carried by said finder, means for movably mounting said finder, a scale, and a pointer extending from said finder in operative relation to said scale.

In testimony whereof I affix my signature in presence of two witnesses.

ELMER L. BURKET.

Witnesses:
R. D. LORENZ,
HARRY L. BURKET.